(12) United States Patent
Zhu et al.

(10) Patent No.: US 11,453,991 B2
(45) Date of Patent: Sep. 27, 2022

(54) HIGH STRENGTH GROUTING METHOD FOR SINGLE PILE ROCK-SOCKETED FOUNDATION OF WEAKLY WEATHERED BED ROCK FOR OFFSHORE WIND POWER

(71) Applicant: ZHEJIANG UNIVERSITY, Zhejiang (CN)

(72) Inventors: Ronghua Zhu, Zhejiang (CN); Hengfeng Wang, Zhejiang (CN); Zhenya Tian, Zhejiang (CN); Hanqiu Liu, Zhejiang (CN); Zhisheng Tu, Zhejiang (CN); Xiang Sun, Zhejiang (CN); Qingfu Xu, Zhejiang (CN); Peiling Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/243,591

(22) Filed: Apr. 29, 2021

(65) Prior Publication Data
US 2022/0025605 A1 Jan. 27, 2022

(30) Foreign Application Priority Data
Jul. 22, 2020 (CN) .......................... 202010713126.9

(51) Int. Cl.
| E02D 27/52 | (2006.01) |
| F03D 13/20 | (2016.01) |
| E02D 5/38 | (2006.01) |
| E02D 27/42 | (2006.01) |
| E02D 15/04 | (2006.01) |

(Continued)

(52) U.S. Cl.
CPC ............ *E02D 27/525* (2013.01); *E02D 5/385* (2013.01); *E02D 5/40* (2013.01); *E02D 15/04* (2013.01); *E02D 15/06* (2013.01); *E02D 27/425* (2013.01); *F03D 13/22* (2016.05); *F03D 13/25* (2016.05); *E02D 2200/1685* (2013.01); *E02D 2250/0007* (2013.01); *E02D 2250/0015* (2013.01); *E02D 2250/0061* (2013.01);

(Continued)

(58) Field of Classification Search
CPC combination set(s) only.
See application file for complete search history.

(56) References Cited

U.S. PATENT DOCUMENTS

| 5,697,734 | A | * | 12/1997 | Verstraeten | ............... | E02D 5/50 405/242 |
| 2005/0019104 | A1 | * | 1/2005 | Christians | ................. | E02D 5/50 405/233 |

(Continued)

*Primary Examiner* — Kyle Armstrong
(74) *Attorney, Agent, or Firm* — JCIP Global Inc.

(57) ABSTRACT

The present invention is a grouting method for single pile rock-socketed foundation for offshore wind power, comprising: driving a steel casing into an overburden layer to dig the overburden layer and a rock stratum so as to dig a pile hole; hoisting a steel pipe pile into the steel casing and positioning the steel pipe pile in the pile hole, wherein an annular cavity is formed between the inner walls of the steel pipe pile and the pile hole and the bottom of the steel casing; grouting a first grouting layer to the bottom of a pipe hole of the steel pipe pile; grouting a plurality of grouting layers into the upper end of the first grouting layer in the annular cavity; and pulling out the steel casing, wherein after a grouting solution is aged, the steel pipe pile is stably connected to the overburden layer and the rock stratum.

20 Claims, 3 Drawing Sheets

(51) Int. Cl.
*E02D 5/40* (2006.01)
*E02D 15/06* (2006.01)
*F03D 13/25* (2016.01)

(52) U.S. Cl.
CPC .................. *E02D 2300/002* (2013.01); *E02D 2300/0029* (2013.01); *F05B 2240/95* (2013.01)

(56) References Cited

U.S. PATENT DOCUMENTS

2014/0314497 A1* 10/2014 Wang .................. E02D 5/34
  405/240
2018/0355573 A1* 12/2018 Thomas .................. E02D 27/12

* cited by examiner

HIGH STRENGTH GROUTING METHOD FOR SINGLE PILE ROCK-SOCKETED FOUNDATION OF WEAKLY WEATHERED BED ROCK FOR OFFSHORE WIND POWER

CROSS-REFERENCE TO RELATED APPLICATION

This application claims a priority to Chinese Patent Application Serial No. 202010713126.9 filed on Jul. 22, 2020. The entirety of the above-mentioned patent applications is incorporated herein by reference and made a part of this specification.

BACKGROUND

Technical Field

The present invention belongs to the technical field of offshore wind power, and in particular relates to a high strength grouting method for a single pile rock-socketed foundation of a weakly weathered bed rock for offshore wind power.

Description of Related Art

In an offshore wind power development process, some field areas are complex in geological condition: subcutaneous layers are floppy overburden layers and hard rock stratums are below the overburden layers. If a pile foundation of a large diameter single pile foundation is merely driven into the earth in the surface layer, a bearing capacity provided by the pile foundation cannot meet the demand. In order to meet the design requirement of the bearing capacity, it is needed to embed a pile toe portion of the large diameter single pile foundation into the rock stratum below the overburden layer to form the rock-socketed pile.

The rock-socketed pile is constructed by drilling a hole and sinking the pile. The aperture of a pile hole generated by drilling is larger than the diameter of the single pile, such that the large diameter single pile is directly implanted into the drilled hole subsequently. A gap exists between the outer wall of the steel pipe pile and the pile hole. It is needed to fill the gap between the steel pipe pile and the pile hole by means of a grouting material of certain strength. After the grouting material is aged, the bearing capacity and the stability of the single pile are guaranteed so as to resist impact caused by a load of a turbine and a load of an external environment. The weakly weathered rock is weak in weathering degree, and the rock body is clear and intact and relatively hard in original structure, such that the weakly weathered rock is an ideal object for grouting and rock-socketing. At present, in a rock-socketed single pile construction process, the gap between the steel pipe pile and a rock and soil layer is filled by grouting filler generally, such that a foundation and the rock layer are connected rigidly, which is easy to lead to fatigue rupture of the single pile and local buckling failure of a steel structure of the single pile.

SUMMARY

In order to overcome defects in the prior art, the present invention provides a technical scheme of the high strength grouting method for the single pile rock-socketed foundation of the weakly weathered bed rock for offshore wind power. Different from an existing popular grouting technology, the grouting method adopts a layered construction process. The multi-time grouting method includes dividing a grouting area into five layers to grout for five times from bottom to top. The grouting materials of different strength are adopted in different layers, such that it can be ensured that the single pile function and the rock and soil layer are stably connected, and the single pile foundation is reliable in bearing performance; the single pile and the rock layer are not rigidly connected completely, such that the fatigue rupture of the single pile and the local buckling failure of the structure are avoided. The earlier stage construction cost for offshore wind power can be further lowered, and the economical benefit of the offshore wind power is improved.

A high strength grouting method for a single pile rock-socketed foundation of a weakly weathered bed rock for offshore wind power, the method including the steps of:

step S1, driving a steel casing into an overburden layer and leaning against a rock stratum, and performing excavation on the overburden layer and the rock stratum under the protection of the steel casing to dig a pile hole, wherein an inner diameter of the pile hole corresponds to an outer diameter of the steel casing;

step S2, hoisting a steel pipe pile into the steel casing and positioning the steel pipe pile in the pile hole, wherein an annular cavity is formed between the inner walls of the steel pipe pile and the pile hole and the bottom of the steel casing;

step S3, grouting a first grouting layer into the bottom of a pipe hole of the steel pipe pile for sealing the bottom of the steel pipe pile;

step S4, grouting a second grouting layer, a third grouting layer, a fourth grouting layer and a fifth grouting layer successively into the annular cavity, wherein the second grouting layer and the third grouting layer are located in the rock stratum, the fourth grouting layer and the fifth grouting layer are located in the overburden layer, the second grouting layer is made of an ultra-high strength cement-based grouting material, and the fourth grouting layer is made of an ultra-high strength cement-based grouting material and the fourth grouting layer is a common high strength cement-based grouting material; and step S5, pulling out the steel casing, wherein the steel pipe pile is stably connected to the overburden layer and the rock stratum after a grouting solution is aged, to form a stable and reliable fan foundation.

The high strength grouting method for the single pile rock-socketed foundation of the weakly weathered bed rock for offshore wind power, characterized in that in the step S3, when grouting the first grouting layer, the grouting solution is grouted to the bottom of the pipe hole of the steel pipe pile first, and then the steel pipe pile is lifted upward, such that the grouting solution enters the annular cavity, and then the steel pipe pile is put down, and the first grouting layer is formed after the grouting solution is aged.

The high strength grouting method for the single pile rock-socketed foundation of the weakly weathered bed rock for offshore wind power, characterized in that when grouting the first grouting layer, a first grouting pipe is hoisted into the pipe hole of the steel pipe pile for grouting.

The high strength grouting method for the single pile rock-socketed foundation of the weakly weathered bed rock for offshore wind power, characterized in that in the step S4, a pipe wall of the steel pipe pile is provided with a plurality of grouting openings corresponding to the second grouting layer, the third grouting layer, the fourth grouting layer and the fifth grouting layer respectively, an inner wall of the pipe hole of the steel pipe pile is provided with a plurality of grouting pipes connected to the respective grouting openings, and different grouting layers are grouted through the grouting pipes connected to the different grouting openings.

The high strength grouting method for the single pile rock-socketed foundation of the weakly weathered bed rock for offshore wind power, characterized in that in the step S4, when grouting the fourth grouting layer and the fifth grouting layer, the steel casing is lifted at a uniform speed while grouting is performed.

The high strength grouting method for the single pile rock-socketed foundation of the weakly weathered bed rock for offshore wind power, characterized in that a 28d compressive strength of the ultra-high strength cement-based grouting material is greater than 120 MPa.

The high strength grouting method for the single pile rock-socketed foundation of the weakly weathered bed rock for offshore wind power, characterized in that a 28d compressive strength of the high strength cement-based grouting material is 100-120 MPa.

The high strength grouting method for the single pile rock-socketed foundation of the weakly weathered bed rock for offshore wind power, characterized in that a 28d compressive strength of the common high strength cement-based grouting material is 80-100 MPa.

The high strength grouting method for the single pile rock-socketed foundation of the weakly weathered bed rock for offshore wind power, characterized in that the first grouting layer is made of a low strength grouting material having the 28d compressive strength smaller than 80 MPa.

Compared with the prior art, the present invention has the beneficial effects that the present invention is suitable for seabed geology which is shallow in covering by a soil layer and is primarily formed by the weakly weathered rocks. Compared with a friction pile, the pile is higher in bearing capacity. Compared with grouting connection by adopting a single high strength material, the present invention adopts the multilayered grouting process, so that a stress concentration problem easily induced by the high strength material can be solved and the risk of fatigue rupture and the local buckling failure of the structure is reduced. As a high strength grouting material and a low strength grouting material are distributed reasonably and are arranged in proper positions, performance of the materials can be exerted to the maximum extent, the construction cost in the earlier stage is lowered, and the economical benefit of offshore wind power is improved.

DESCRIPTION OF THE EMBODIMENTS

Figure 1:
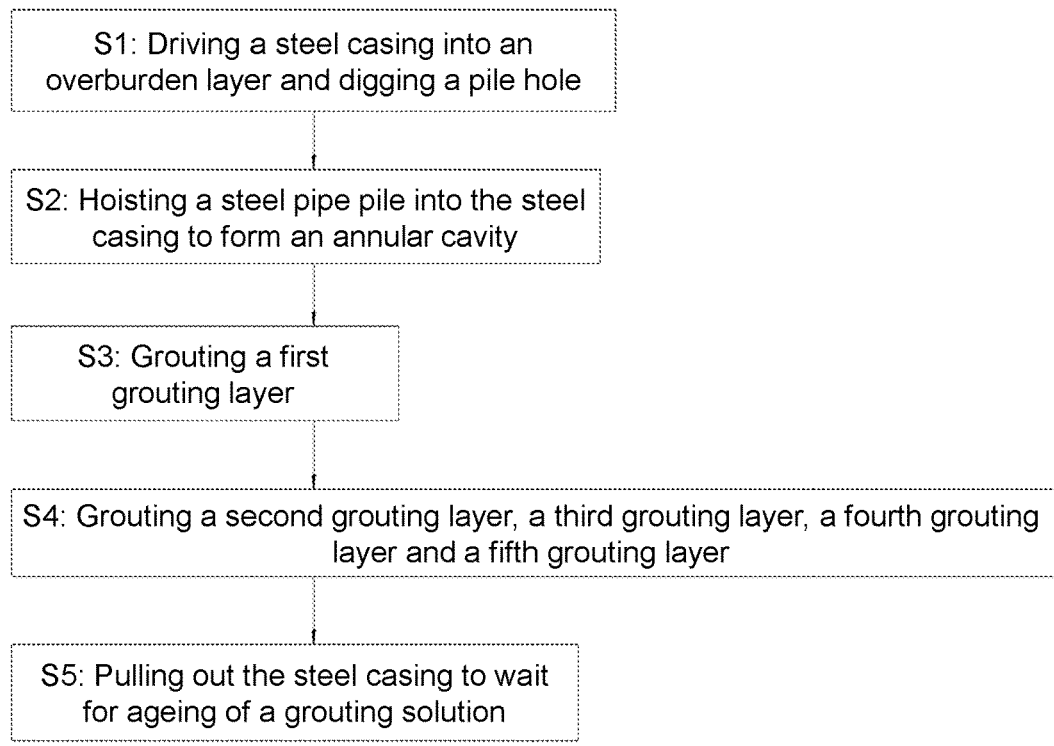
FIG. 1 is a flow diagram of the grouting method of the present invention.
Figure 2:
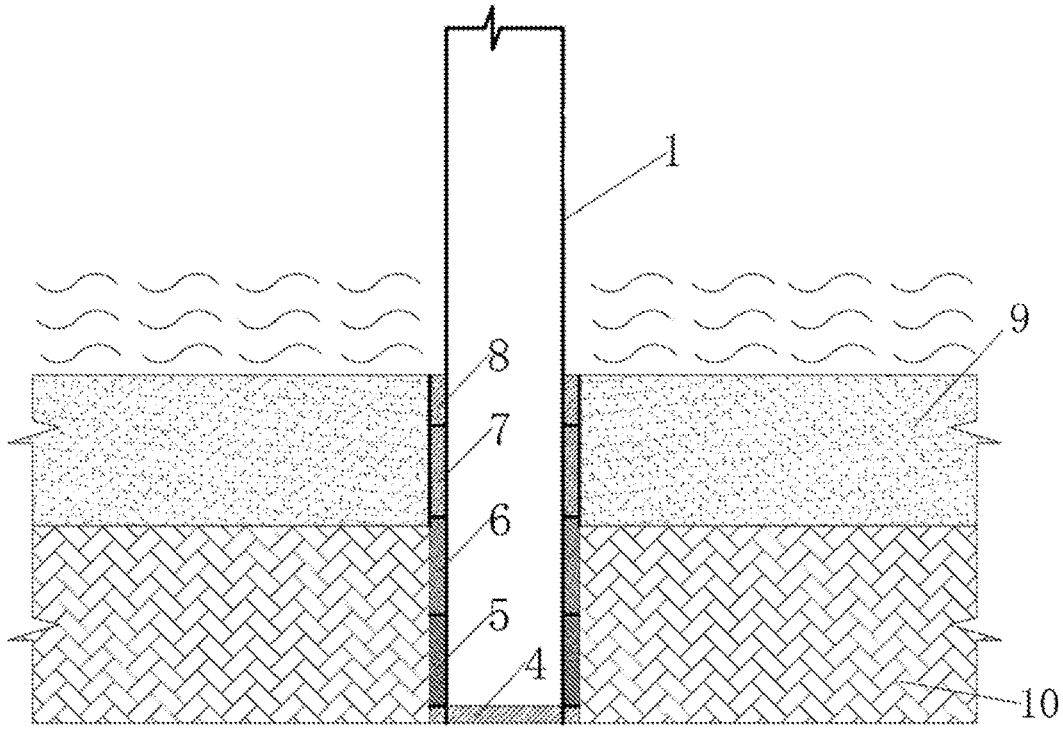
FIG. 2 is a structural schematic diagram of the present invention after grouting.

The present invention will be further elaborated hereafter in connection with the drawings.

As shown in the figures, a high strength grouting method for a single pile rock-socketed foundation of a weakly weathered bed rock for offshore wind power, the method including the steps of:

step S1, driving a steel casing 2 into an overburden layer 9, wherein the top end of the steel casing 2 is located on a sea level and the lower end of the steel casing leans against a rock stratum 10, and performing excavation on the overburden layer 9 and the rock stratum 10 under the protection of the steel casing 2 to dig a pile hole, wherein an inner diameter of the pile hole corresponds to an outer diameter of the steel casing 2;

step S2, hoisting a steel pipe pile 1 into the steel casing 2 and positioning the steel pipe pile in the pile hole, wherein an annular cavity 12 is formed between the inner walls of the steel pipe pile 1 and the pile hole and the bottom of the steel casing 2, and when the steel casing 2 is lifted upward, the annular cavity 11 is enlarged therewith;

step S3, grouting a first grouting layer into the bottom of a pipe hole of the steel pipe pile 1 for sealing the bottom of the steel pipe pile 1;

step S4, grouting a second grouting layer 5, a third grouting layer 6, a fourth grouting layer 7 and a fifth grouting layer 8 successively into the annular cavity 11, wherein the second grouting layer 5 and the third grouting layer 6 are located in the rock stratum 10, the fourth grouting layer 7 and the fifth grouting layer 8 are located in the overburden layer 9, the second grouting layer 5 is made from an ultra-high strength cement-based grouting material, the third grouting layer 6 is made of a high strength cement-based grouting material, and the fourth grouting layer 7 is made of a common high strength cement-based grouting material; and step S5, pulling out the steel casing 2, wherein the steel pipe pile 1 is stably connected to the overburden layer 9 and the rock stratum 10 after a grouting solution is aged, to form a stable and reliable fan foundation.

In the step S1, hole digging specifically includes: hollowing the overburden layer 9 in the steel casing 2, then hollowing the rock stratum 10 at the lower end of the steel casing 2, in particular, excavating a portion at the lower end of the wall of the steel casing 2 so as to form the annular cavity 11 after the steel pipe pile 1 is inserted into the steel casing 2, and the steel casing 2 can guarantee that the overburden layer 9 does not collapse in the hollowing process.

In the step S3, when the first grouting layer 4 is grouted, the grouting solution is grouted to the bottom of the pipe hole of the steel pipe pile 1 first, and then the steel pipe pile 1 is lifted upward, such that the grouting solution enters the annular cavity 11, and then the steel pipe pile 1 is put down, and after the grouting solution is aged, the first grouting layer 4 is formed. The first grouting layer 4 can prevent the rest of grouting solution to flow into the steel pipe pile 1 to lead to waste of materials. The first grouting layer 4 is merely used for sealing and is smaller in thickness, free of strength demand, and can adopt a material which is lower in strength. When grouting the first grouting layer 4, a first grouting pipe 12 is hoisted into the pipe hole of the steel pipe pile 1 by a crane for grouting.

Figure 3:
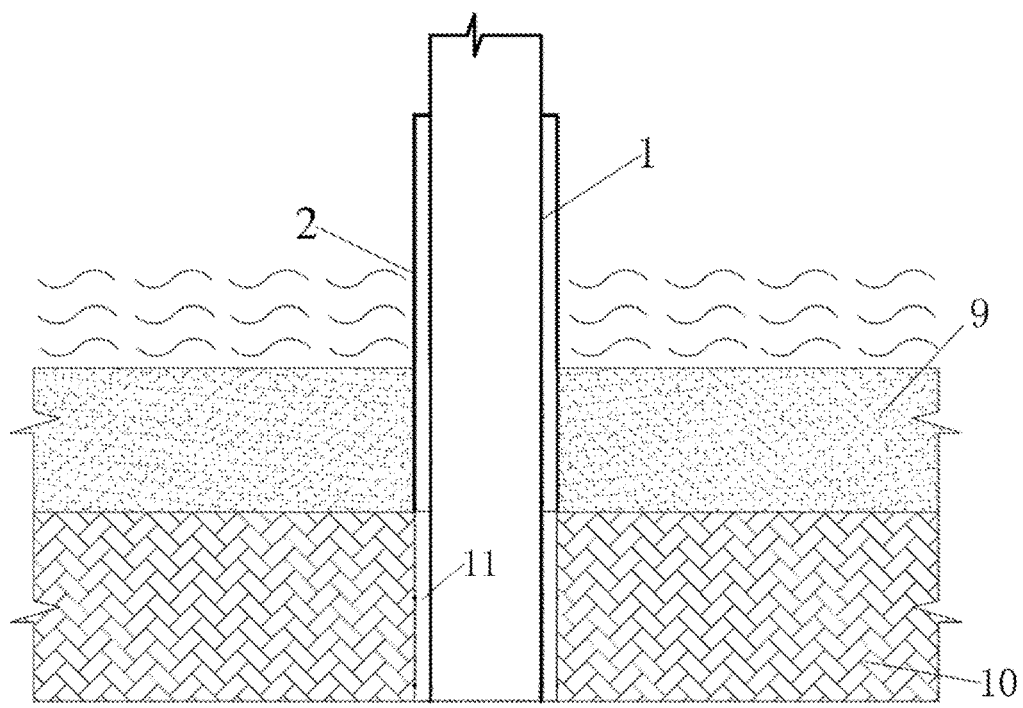
FIG. 3 is a schematic diagram of the grouting process of the present invention, and at the time, an annular cavity is formed between the inner walls of the steel pipe pile and the pile hole and the bottom of the steel casing, and the annular cavity is not grouted.
Figure 4:
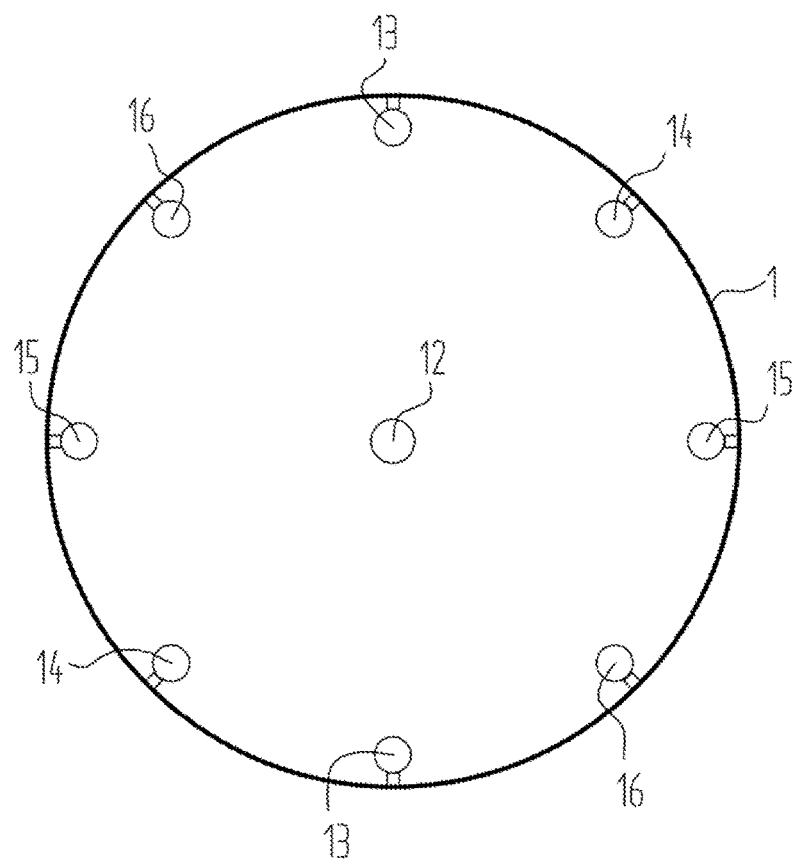
FIG. 4 is a top view when each grouting pipe is mounted in the steel pipe pile of the present invention.
Figure 5:
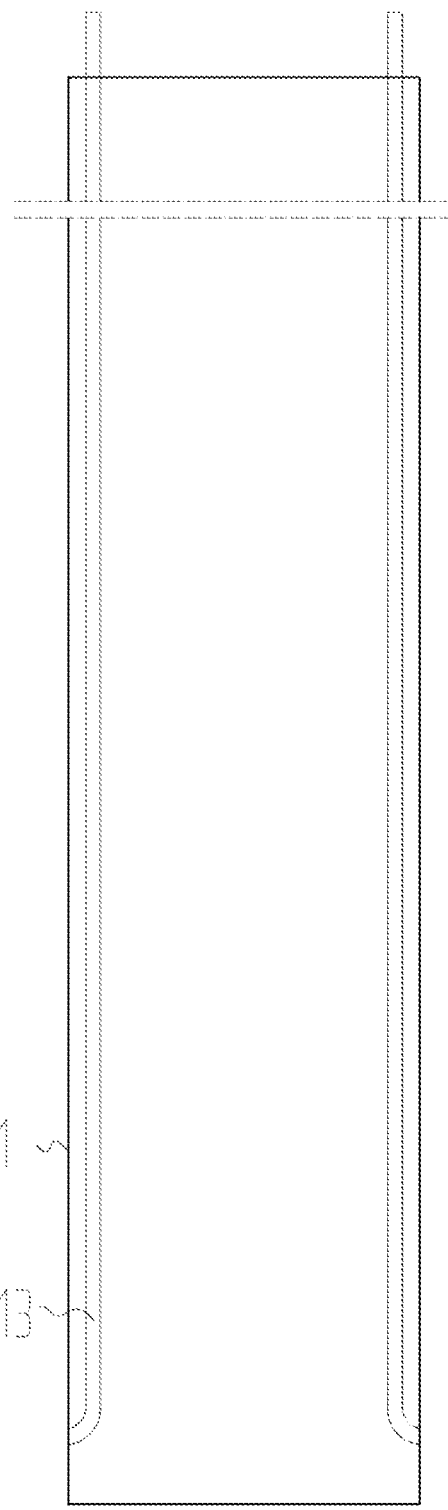
FIG. 5 is an internal structural schematic diagram when the second grouting pipe is mounted in the steel pipe pile of the present invention.

In the step S4, a pipe wall of the steel pipe pile 1 is provided with a plurality of grouting openings corresponding to the second grouting layer 5, the third grouting layer 6, the fourth grouting layer 7 and the fifth grouting layer 8 respectively, an inner wall of the pipe hole of the steel pipe pile 1 is provided with a plurality of grouting pipes connected to the grouting openings, and different grouting layers are grouted through the grouting pipes connected to the different grouting openings. In particular, as shown in the FIG. 4, two second grouting pipes 13 for grouting the second grouting layer 5, two third grouting pipes 14 for grouting the third grouting layer 6, two fourth grouting pipes 15 for grouting the fourth grouting layer 7 and two fifth grouting pipes 16 for grouting the fifth grouting layer 8 are fixedly mounted on the inner wall of the pipe hole of the steel pipe pile 1 separately. The grouting pipes of the same type are mounted symmetrically, and the four grouting pipes are staggered in position, and most preferably, are uniformly and annularly distributed on the inner wall of the pipe hole of the steel pipe pile 1. As shown in the FIG. 3, by taking the second grouting pipes 13 as an example, two symmetrical grouting openings are formed in parts, corresponding to the second grouting layer 5, on the pipe wall of the steel pipe pile 1, and the lower ends of the two second grouting pipes 13 are abutted to the corresponding grouting openings, so as to achieve a purpose of grouting the second grouting layer 5. The third grouting pipes 14, the fourth grouting pipes 15 and the fifth grouting pipes 16 are as same as the second grouting pipes 13 in mounting mode, and no more detailed description is made herein.

In the step S4, when the fourth grouting layer 7 and the fifth grouting layer 8 are grouted, the steel casing 2 is lifted at the uniform speed by the crane while grouting is performed to prevent a condition that the steel casing is hardly pulled out as a result of coagulation of the grouting solution and the steel casing.

The grouting material of the second grouting layer 5 is an important part which connects the steel pipe pile 1 to the rock stratum 10, which plays a primary supporting role. Thus, the ultra-high strength cement-based grouting material is adopted, and the 28d compressive strength of the ultra-high strength cement-based grouting material is greater than 120 MPa. The third grouting layer 6 is still located in the rock stratum 10. Thus, a high strength cement-based grouting material is adopted, and the 28d compressive strength of the high strength cement-based grouting material is 100-120 MPa. The 28d compressive strength of the common high strength cement-based grouting material is 80-100 MPa.

The first grouting layer 4 and the fifth grouting layer 8 are made from a low strength grouting material, 28d compressive strength of which is smaller than 80 MPa.

In the present invention, by adopting a method of grouting different materials in multiple layers, the primary bearing portion of the lower portion is the grouting material which is high in strength and the upper portion is the grouting material which is low in strength. The grouting material which is low in strength is unlikely to lead to the stress concentration problem of the steel pipe pile structure, such that complete rigid connection between the steel pipe pile and the rock and soil layer can be avoided, the fatigue rupture of the single pile foundation and the local buckling failure of the structure are avoided, and it can be further ensured that the single pile rock-socketed foundation still has an enough bearing capacity. In addition, the construction cost further can be lowered and the economical benefit of the offshore wind power is improved.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

What is claimed is:

1. A high strength grouting method for a single pile rock-socketed foundation of a weakly weathered bed rock for offshore wind power, the method comprising the steps of:

step S1, driving a steel casing (2) into an overburden layer (9) and leaning against a rock stratum (10), and performing excavation on the overburden layer (9) and the rock stratum (10) under the protection of the steel casing (2) to dig a pile hole, wherein an inner diameter of the pile hole corresponds to an outer diameter of the steel casing (2);

step S2, hoisting a steel pipe pile (1) into the steel casing (2) and positioning the steel pipe pile (1) in the pile hole, wherein an annular cavity (11) is formed between the inner walls of the steel pipe pile (1) and the pile hole and the bottom of the steel casing (2);

step S3, grouting a first grouting layer (4) into the bottom of a pipe hole of the steel pipe pile (1) for sealing the bottom of the steel pipe pile (1);

step S4, grouting a second grouting layer (5), a third grouting layer (6), a fourth grouting layer (7) and a fifth grouting layer (8) successively into the annular cavity (11), wherein the second grouting layer (5) and the third grouting layer (6) are located in the rock stratum (10), the fourth grouting layer (7) and the fifth grouting layer (8) are located in the overburden layer (9), the second grouting layer (5) is made from an ultra-high strength cement-based grouting material, the third grouting layer (6) is made of a high strength cement-based grouting material, and the fourth grouting layer (7) is made of a common high strength cement-based grouting material; and step S5, pulling out the steel casing (2), wherein the steel pipe pile (1) is stably connected to the overburden layer (9) and the rock stratum (10) after a grouting solution is aged, to form a stable and reliable fan foundation.

2. The high strength grouting method for the single pile rock-socketed foundation of the weakly weathered bed rock for offshore wind power according to claim 1, wherein in the step S3, when grouting the first grouting layer (4), the grouting solution is grouted to the bottom of the pipe hole of the steel pipe pile (1) first, and then the steel pipe pile (1) is lifted upward, such that the grouting solution enters the annular cavity (11), and then the steel pipe pile (1) is put down, and the first grouting layer (4) is formed after the grouting solution is aged.

3. The high strength grouting method for the single pile rock-socketed foundation of the weakly weathered bed rock for offshore wind power according to claim 2, wherein when grouting the first grouting layer (4), a first grouting pipe (12) is hoisted into the pipe hole of the steel pipe pile (1) for grouting.

4. The high strength grouting method for the single pile rock-socketed foundation of the weakly weathered bed rock for offshore wind power according to claim 3, wherein 28d compressive strength of the ultra-high strength cement-based grouting material is greater than 120 MPa.

5. The high strength grouting method for the single pile rock-socketed foundation of the weakly weathered bed rock for offshore wind power according to claim 3, wherein 28d compressive strength of the high strength cement-based grouting material is 100-120 MPa.

6. The high strength grouting method for the single pile rock-socketed foundation of the weakly weathered bed rock for offshore wind power according to claim 3, wherein 28d compressive strength of the common high strength cement-based grouting material is 80-100 MPa.

7. The high strength grouting method for the single pile rock-socketed foundation of the weakly weathered bed rock for offshore wind power according to claim 2, wherein 28d compressive strength of the ultra-high strength cement-based grouting material is greater than 120 MPa.

8. The high strength grouting method for the single pile rock-socketed foundation of the weakly weathered bed rock for offshore wind power according to claim 2, wherein 28d compressive strength of the high strength cement-based grouting material is 100-120 MPa.

9. The high strength grouting method for the single pile rock-socketed foundation of the weakly weathered bed rock for offshore wind power according to claim 2, wherein 28d compressive strength of the common high strength cement-based grouting material is 80-100 MPa.

10. The high strength grouting method for the single pile rock-socketed foundation of the weakly weathered bed rock for offshore wind power according to claim 1, wherein in the step S4, a pipe wall of the steel pipe pile (1) is provided with a plurality of grouting openings corresponding to the second grouting layer (5), the third grouting layer (6), the fourth grouting layer (7), and the fifth grouting layer (8) respectively, an inner wall of the pipe hole of the steel pipe pile (1) is provided with a plurality of grouting pipes connected to the respective grouting openings, and different grouting layers are grouted through the grouting pipes connected to the different grouting openings.

11. The high strength grouting method for the single pile rock-socketed foundation of the weakly weathered bed rock for offshore wind power according to claim 10, wherein 28d compressive strength of the ultra-high strength cement-based grouting material is greater than 120 MPa.

12. The high strength grouting method for the single pile rock-socketed foundation of the weakly weathered bed rock for offshore wind power according to claim 10, wherein 28d compressive strength of the high strength cement-based grouting material is 100-120 MPa.

13. The high strength grouting method for the single pile rock-socketed foundation of the weakly weathered bed rock for offshore wind power according to claim 10, wherein 28d compressive strength of the common high strength cement-based grouting material is 80-100 MPa.

14. The high strength grouting method for the single pile rock-socketed foundation of the weakly weathered bed rock for offshore wind power according to claim 1, wherein in the step S4, when grouting the fourth grouting layer (7) and the fifth grouting layer (8), the steel casing (2) is lifted at a uniform speed while grouting is performed.

15. The high strength grouting method for the single pile rock-socketed foundation of the weakly weathered bed rock for offshore wind power according to claim 14, wherein 28d compressive strength of the ultra-high strength cement-based grouting material is greater than 120 MPa.

16. The high strength grouting method for the single pile rock-socketed foundation of the weakly weathered bed rock for offshore wind power according to claim 14, wherein 28d compressive strength of the high strength cement-based grouting material is 100-120 MPa.

17. The high strength grouting method for the single pile rock-socketed foundation of the weakly weathered bed rock for offshore wind power according to claim 1, wherein 28d compressive strength of the ultra-high strength cement-based grouting material is greater than 120 MPa.

18. The high strength grouting method for the single pile rock-socketed foundation of the weakly weathered bed rock for offshore wind power according to claim 1, wherein 28d compressive strength of the high strength cement-based grouting material is 100-120 MPa.

19. The high strength grouting method for the single pile rock-socketed foundation of the weakly weathered bed rock for offshore wind power according to claim 1, wherein 28d compressive strength of the common high strength cement-based grouting material is 80-100 MPa.

20. The high strength grouting method for the single pile rock-socketed foundation of the weakly weathered bed rock for offshore wind power according to claim 1, wherein the first grouting layer (4) is made of a low strength grouting material having the 28d compressive strength smaller than 80 MPa.

* * * * *